United States Patent Office 3,154,529
Patented Oct. 27, 1964

3,154,529
PROCESS FOR IMPROVING PROCESSABILITY OF HIGH MOLECULAR WEIGHT POLYPROPYLENE
Yuji Kobayashi, Tokyo, Noboru Fukuma, Nobeoka-shi, and Atsushi Fitaoka, Takatsuki-shi, Japan, assignors to Asahi Kasei Kogyo Kabushiki Kaisha, Osaka, Japan, a corporation of Japan
No Drawing. Filed Dec. 14, 1962, Ser. No. 244,577
11 Claims. (Cl. 260—93.7)

This invention relates to a process for improving the processability of high molecular weight polypropylene consisting of crystalline linear polymer in a principal portion thereof by converting said polypropylene to polypropylene having a lower average molecular weight.

Heretofore, it was well known that propylene is polymerized by using a catalyst consisting of titanium trichloride and triethylaluminum to give crystalline polypropylene. Many other kinds of catalyst systems have been developed for the same purpose. It is also well known that the thus obtained polypropylene is composed of a mixture containing crystalline isotactic polymer, stereoblock polymer and non-crystalline atactic polymer. For the production of fiber, film and other molded articles, the polymer containing crystalline polymer should be present in a major portion and atactic polymer in only a minor portion since said non-crystalline atactic polymer affects the properties of said products to give them a waxy touch and less rigidity. It is further well known that the average molecular weight of said crystalline isotactic polypropylene obtained by the commercial polymerization process using the above-said catalyst system is considerably high so that it amounts to the value corresponding to more than an intrinsic viscosity of 2 as measured in tetraline solution at 135° C. (which will be merely represented as "intrinsic viscosity" hereinunder.

Processing of polypropylene whose average molecular weight is so high is very difficult by the use of ordinary processing means, because of the high melting viscosity thereof. The process of overcoming said difficulty was disclosed in the specification of Japanese patent application No. 6640/1945. The process comprises heating said high molecular weight crystalline polypropylene in absence of oxygen at a temperature between 250 and 350° C. for 20 min. for about several hours, or in the presence of oxygen at a temperature between 150 and 180° C. for about 1 to 5 min. for the purpose of lowering the average molecular weight of the polypropylene before or during the processing.

However, said process of treating polypropylene in the absence of oxygen takes a long time (more than 20 min.), and therefore, it is uneconomical. For short time processing, the presence of oxygen is essential. Apparatus and associated procedures for processing are considerably restricted by the above-said facts.

We have found a novel, simple and effective process for improving the processability of high molecular weight polypropylene containing crystalline polymer in a principal portion by converting said polypropylene to polypropylene having an appropriate lower average molecular weight.

This invention is based on the discovery of the fact that organo-tin-compounds as described hereinunder are extremely effective for lowering the average molecular weight of said crystalline polypropylene at a high temperature.

Said organo-tin-compounds are represented in the following general formulas, wherein R is selected from the group consisting of an alkyl group having 1 to 18 carbon atoms, a benzyl group, and a phenyl group.

(1) General formula $$[R]_2Sn[OOCR']_2$$

wherein R' represents an alkyl group having 1 to 17 carbon atoms which is a saturated monobasic fatty acid radical, or phenol group which is a monobasic phenolic acid radical.

For example,

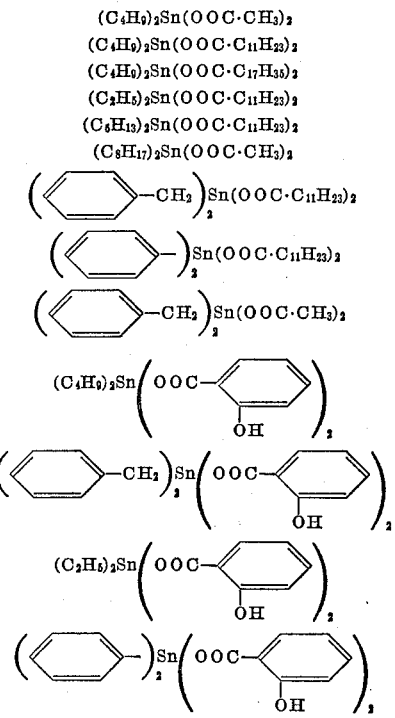

(2) General formula

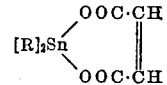

or

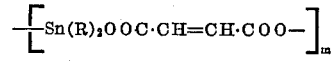

wherein $m$ is an integer, and $m \geq 1$.
For example,

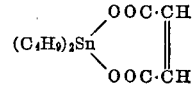

or

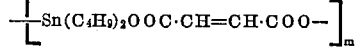

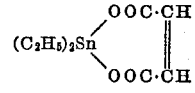

or

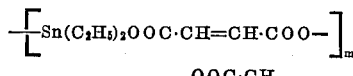

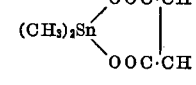

or

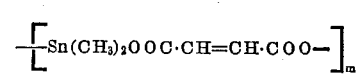

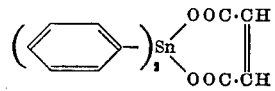

or

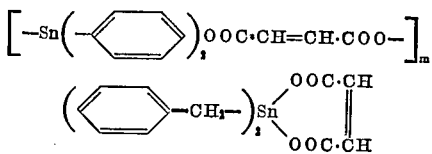

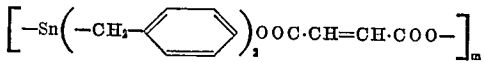

or

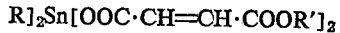

(3) General formula $$R_2Sn[OOC \cdot CH=CH \cdot COOR']_2$$

wherein R' represents an alkyl group having 1 to 18 carbon atoms or a hydroxyalkyl group having 2 to 4 carbon atoms. For example,

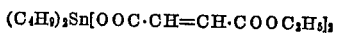
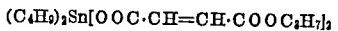
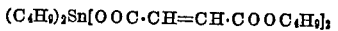
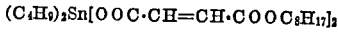
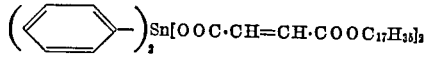
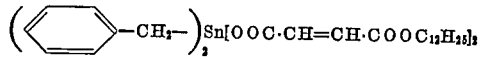
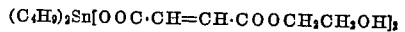
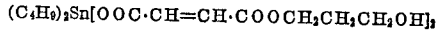
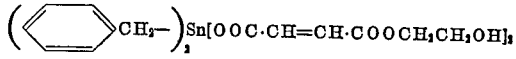

(4) General formula $$[R]_2Sn[OR'] \text{ or } R'O\text{-}[Sn(R)_2O\text{—}]_s R'$$

wherein R' represents an alkyl group having 1 to 18 carbon atoms or a phenyl group, S is an integer and $S \geq 2$.
For example,

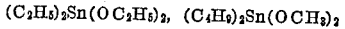

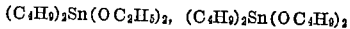

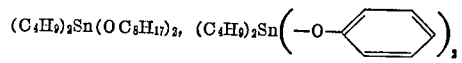

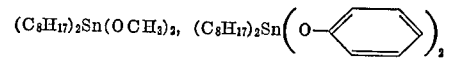

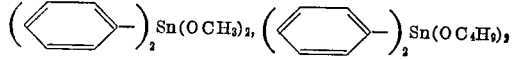

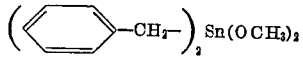

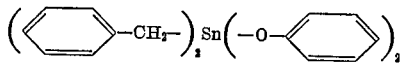

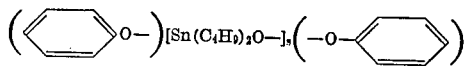

(5) General formula $$R'O[Sn(R)_2O]_mOCR''$$

wherein R' is an alkyl group having 1 to 18 carbon atoms and R'' is an alkyl group having 1 to 17 carbon atoms.
For example,

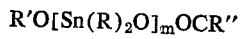

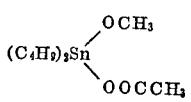

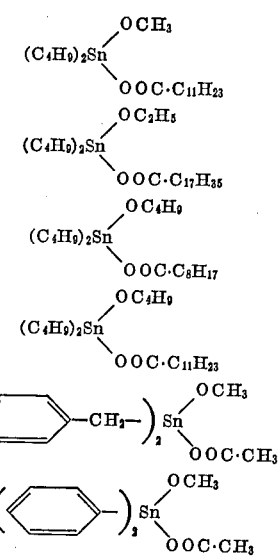

$CH_3O\text{—}[Sn(C_4H_9)_2O]_mOC \cdot CH$, $m \geq 2$ and is an integer,
$C_4H_9O\text{—}[Sn(C_4H_9)_2O]_mOC \cdot C_8H_{17}$, $m$ is an integer, and $m \geq 2$,
$C_4H_9O[Sn(C_4H_9)_2O]_mOC \cdot C_{11}H_{23}$, $m$ is an integer, and $m \geq 2$.

(6) General formula $$R'O\text{—}[Sn(R)_2O\text{—}]_mOC \cdot CH=CH \cdot COOR''$$

wherein R', R'' represent alkyl groups having 1 to 18 carbon atoms, respectively, $m$ is an integer, and $m \geq 1$.
For example,

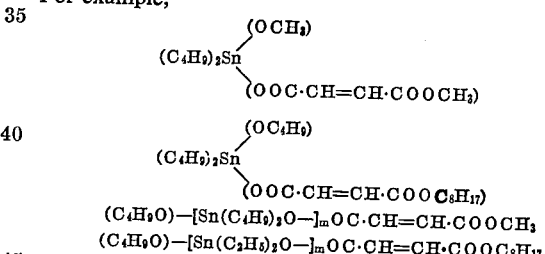

$(C_4H_9O)\text{—}[Sn(C_4H_9)_2O\text{—}]_mOC \cdot CH=CH \cdot COOCH_3$
$(C_4H_9O)\text{—}[Sn(C_2H_5)_2O\text{—}]_mOC \cdot CH=CH \cdot COOC_8H_{17}$ (7) General formula

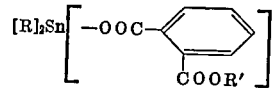

wherein R' is selected from the group consisting of an alkyl group having 1 to 18 carbon atoms, a hydroxyalkyl group having 2 to 4 carbon atoms, and an alkoxy alkyl group denoted by —R''OR', wherein R'' is an alkyl group having 2 to 4 carbon atoms.

For example,

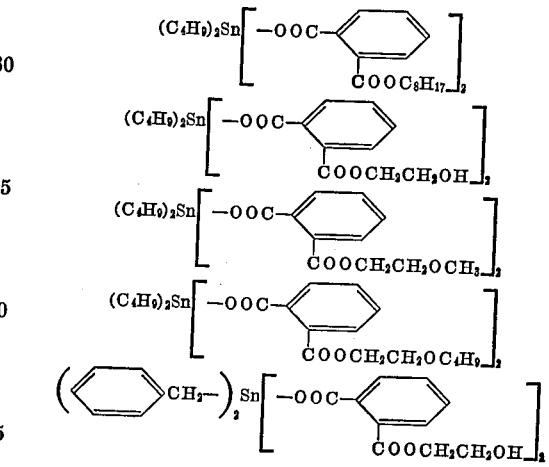

(8) General formula $$[R]_2Sn=S \text{ or } [-Sn(R)_2S-]_m$$

wherein $m$ is an integer, and $m \geq 1$.
For example,

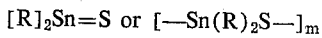

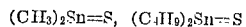

(9) General formula $$[R]_2Sn[SR']_2$$

wherein $R'$ is an alkyl group having 1 to 18 carbon atoms.
For example,

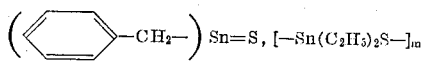

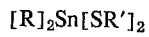

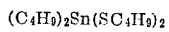

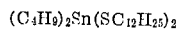

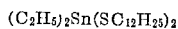

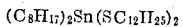

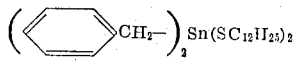

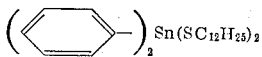

The fact that said organo-tin-compounds affect the lowering of average molecular weight of polypropylene is a surprising and unexpected discovery from a consideration of the fact that some of said organo-tin-compounds are known to be effective for preventing the lowering of the intrinsic viscosity of polypropylene by heating at a temperature of less than about 200° C., in the invention disclosed in the specification of Japanese patent publication No. 5981/1960, and moreover some said organo-tin-compounds are recognized, perhaps incorrectly as substances which are effective for preventing the lowering of intrinsic viscosity even at a temperature of 250° C. to 300° C. in the specification of Japanese patent publication No. 6640/1960.

Thus, the present invention provides a process which comprises admixing said organo-tin-compound to the polypropylene containing crystalline polymer as a major portion and having an intrinsic viscosity more than 2, in an amount of 0.005 to 2% by weight per one of said polymer, and heating said resulting mixture in the absence or presence of oxygen at a temperature of 210° C. to 350° C. until the intrinsic viscosity of said polymer is lowered to a value of between 0.5 to 3.0.

The intrinsic viscosity of polypropylene and also the content of non-crystalline polymer vary in relation to polymerization catalyst and polymerization conditions. However, generally, if conditions are selected such that the content of atactic polymer is decreased the intrinsic viscosity of the polymer produced becomes higher, and may reach 15 in an extreme case. Processing such polymer can not be carried out using conventional processing conditions. Accordingly, a process for improving the processability of such polymer is commercially very advantageous. The aforesaid known processes do not make it possible to improve the processability of such polymer without the accompanying various disadvantages described hereinbefore.

On the contrary, however, the process according to the invention enables the improvement of the processability of extremely high molecular weight polymer very easily. This is one feature of the invention.

The value of intrinsic viscosity of polypropylene preferable for said processing varies in accordance with the viscosity required in the treatment for obtaining the particular desired end product. In general, the intrinsic viscosity in the range of 0.5 to 2.0 is preferable for the production of fine denier fiber, 1.5 to 2.5 for thick denier fiber, 0.5 to 2.2 for film, and 1.5 to 3.0 for molded articles, respectively. Accordingly, in some case the intrinsic viscosity must be lowered from 2.5 to 1.5, in others from 6 to 2.8. The mechanical properties of the product obtained from the polypropylene whose intrinsic viscosity is below 0.5 are unfavorable. Processing the polymer with an intrinsic viscosity of more than 3.0 is very difficult even in the production of molded articles. The aforesaid restrictions for the intrinsic viscosity fo polypropylene in before-and after-processing are based on the abovesaid reasons.

A restriction is established for an amount of 0.005 to 2% by weight, of organo-tin-compound admixed to the polymer, between which is based on the fact that an amount of less than 0.005 is insufficient, and more than 2% is unnecessary.

Though preferable addition amounts vary according to the kind of organo-tin-compound used, the intrinsic viscosity of the starting polymer or the resulting polymer, the presence or absence of oxygen, and the treating temperature or treating time, nevertheless the addition in such a small amount as in the range of 0.05 to 0.5% by weight of the organotin compound enables the accomplishment of abovesaid object. This is another feature of the invention.

Though the preferable treating temperature also depends on the kind of organo-tin-compound used, the amount thereof added, the intrinsic viscosity of the starting and final polymer, the presence or absence of oxygen, and the treating-time, nevertheless the temperature is in the range of 230° C. to 300° C. At a temperature less than 210° C., too long a time must be taken for the treatment, and at a temperature more than 350° C., the waxy touch of said polymer obtained is increased.

The time necessary for the treatment also depends on the kind of organo-tin-compound, the addition amount thereof, the intrinsic viscosity of starting polymer and objective polymer, the presence or absence of oxygen, and the treating temperature, however the time is in the range of several minutes to less than one hundred minutes. When the addition amount of organo-tin-compound is employed in the range of 0.05 to 0.5% by weight and the treating temperature is employed in the range of 240° C. to 290° C., a treatment of only several minutes suffices in many cases. At constant treating conditions, a steep decrease of the intrinsic viscosity occurs in the initial stage and the decrease diminishes with time. This characteristic makes the treatment of the invention very controllable, and accordingly, is a commercial advantage, together with the characteristic of short time treating.

The treatment according to the invention may be carried out in both the absence or presence of oxygen. And, although the time necessary for the treatment varies according to the treating temperature, a treatment of very short time is sufficient even in the absence of oxygen, i.e., in a nitrogen atmosphere. For example, a treatment of only several minutes is sufficient in some conditions. However, the treatment may be carried out in the presence of oxygen, e.g., in air, when there is no need of removal of oxygen therefrom.

The feature of the invention that the objective treatment can be carried out in a very short time even in absence of oxygen may be asserted as a commercial advantage which has never been accomplished by the aforesaid known prior processes. This feature probably relates to the fact that the polymer obtained according to the process of the invention is superior to the polymer obtained according to the prior known processes in the point of less waxy-touch. This superiority concerning less waxy-touch especially provides one great advantage for use of the textile fiber. Mixing raw material polymer with said organo-tin-compound may be carried out by a simple mechanical agitation or by dissolving said organo-tin-compound in an appropriate solvent, then mixing the resulting solution with said polypropylene by agitation, and then evaporating the solvent therefrom.

Heating said resulting polymer mixture may be carried out in a batch system by using a vessel for heating, or by using a conventional Banbury mixer, calender roll, screw conveyor, or the like. However, the simplest treatment on a commercial scale is accomplished in a pelletizing step by using a screw extruder.

Because the air contained in the polymer mixture is removed, by compression, from said melting polymer when heating in an extruder type pelletizer, heating said polymer in presence of oxygen is almost impossible in the pelletizer. Moreover, the heating time available in such a pelletizer is only several minutes to 20 minutes or so. Accordingly, the aforesaid prior processes can not be carried out by using such a convenient machine as pelletizer. On the contrary, the process of the invention can easily be accomplished in said pelletizer, because said process does not need the presence of oxygen, and besides the treating time is only from several minutes to 20 minutes. This is a further a great advantage of the invention.

The details of the process of the invention will be better understood from a consideration of the following examples, which are given merely for the sake of illustration.

*Example 1*

Dibutyl-tin-diacetate $(C_4H_9)_2Sn(OOC \cdot CH_3)_2$ was admixed in amount of 0.3% by weight into powdered polypropylene of which the intrinsic viscosity measured in tetraline solution at 135° C. was 10.4 and the content of crystalline polypropylene measured as the boiling n-heptane insoluble part was 97.0% by weight.

The resulting mixture was extruded by using an extruder type pelletizer without replacing the inside of said pelletizer with nitrogen gas, under the conditions as follows. The time of the polymer in the pelletizer was about 2.5 min. The temperature of the hopper was 170° C. The temperature of the cylinder center was 210° C. The temperature of the cylinder top was 250° C. The intrinsic viscosity of the polymer pellet obtained was 1.7.

Said treated polymer was extruded by using an extruder with a T die at the top by means of conventional process, after which the polymer was coagulated by cooling in water at 20° C., and was reeled to obtain a film having thickness of 5/100 mm. The absence of color and transparency of the film were excellent.

*Example 2*

Dibutyl-tin-maleate

was mixed in an amount of 0.1% by weight with powdered polypropylene of which the intrinsic viscosity was 8.2 and the content of crystalline polymer was 96.3% by weight.

The resulting mixture was introduced into the hopper of a pelletizer and extruded by the pelletizer, the inside of which contained nitrogen gas. The extruding conditions were as follows. The time of the polymer in the pelletizer was about 5 min. The temperature of the hopper was 200° C. The temperature of the cylinder center was 260° C. The temperature of the cylinder top was 290° C. The intrinsic viscosity of the polymer pellet was 1.9. The pellet was subjected to ordinary melt spinning at 250° C. to obtain unstretched yarn. The yarn was stretched to 4 times its length to obtain yarn having a tenacity of 5.5 g./d., and an elongation of 40%. The spinning was next easily carried out.

The same raw material polypropylene was treated by using the same pelletizer in the same manner as described hereinbefore, except that dibutyl-tin-maleate was not added therein and the inside of the pelletizer was not replaced with nitrogen gas. The intrinsic viscosity of the polymer obtained was 5.1. Spinning was impossible.

*Example 3*

Dibutyl-tin-dimethoxide $(C_4H_9)_2Sn(OCH_3)_2$ was mixed in an amount of 0.10% by weight with powdered polypropylene of which the intrinsic viscosity was 10.4 and the content of crystalline polymer was 97.0% by weight. The resulting polymer was pelletized by using a pelletizer containing nitrogen. The conditions were fixed as follows. The time of the polymer in the pelletizer was about 5 min. The temperature of the hopper was 180° C. The temperature of the cylinder center was 270° C. The temperature of the cylinder top was 250° C. The intrinsic viscosity of the polymer pellet obtained was 1.2. The spinning of the polymer by an ordinary spinning method was very easily carried out, and colorless yarn was obtained.

*Example 4*

Dibutyl-tin-di[2-hydroxybenzoate]

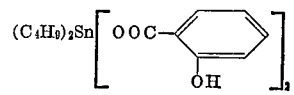

was mixed in an amount of 0.4% by weight with powdered polyproylene of which the intrinsic viscosity was 5.7 and the content of crystalline polymer was 89.7% by weight. The resulting polymer was subjected to heat-treatment in a closed vessel in a nitrogen atmosphere at 250° C. for 4 minutes. The intrinsic viscosity of the polymer obtained was 1.7 and the polymer was slightly pale-yellow.

*Example 5*

Dibutyl-tin-monomethoxy monoacetate

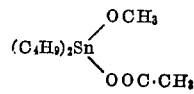

was mixed in an amount of 0.15% by weight with powdered polypropylene of which the intrinsic viscosity was 10.4 and the content of crystalline polymer was 97.0% by weight. The resulting polymer was extruded by using a pelletizer containing nitrogen gas. The extruding conditions were fixed as follows. The time of the polymer in the pelletizer was about 5 min. The temperature of the hopper was 180° C. The temperature of the cylinder center was 250°. The temperature of the cylinder top was 240° C. The intrinsic viscosity of the polymer pellet obtained was 1.7.

*Example 6*

Dibutyl-tin-dilaurate $(C_4H_9)_2Sn(OOC \cdot C_{11}H_{12})_2$ was mixed in an amount of 0.2% by weight with powdered polypropylene of which the intrinsic viscosity was 8.2 and the content of crystalline polymer was 96.3% by weight.

The resulting mixture was extruded from a pelletizer containing nitrogen. The time of the polymer in the pelletizer was about 5 minutes. The temperature of the hopper part was 170° C., the temperature of the cylinder-center was 210° C., and the temperature of the cylinder top was 250° C. The intrinsic viscosity of the pellet was 1.6.

*Example 7*

Dibutyl-tin-bis mono β-hydroxyethylphthalate

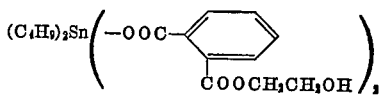

was mixed in an amount of 0.1% by weight with powdered polypropylene of which the intrinsic viscosity was 10.4 and the content of crystalline polymer was 97.0% by wt. The resulting mixtlre was extruded from a pelletizer without replacing with nitrogen gas. The same extruding conditions as in Example 6 were employed. The intrinsic viscosity of the polymer pellet was 1.9.

*Example 8*

Dibutyl-tin-lauryl mercaptide $(C_4H_9)_2Sn(SC_{12}H_{25})_2$ was mixed in amount of 0.5% by weight into powdered polypropylene of which the intrinsic viscosity was 7.3 and the content of crystalline polymer was 94.8% by wt. The resulting mixture was extruded from a pelletizer containing nitrogen gas. The extruding conditions were fixed as follows. The temperature of the cylinder top was 270° C. The time of the polymer in the pelletizer was about 6 minutes. The polymer pellet obtained was slightly pale yellow and the intrinsic viscosity was 2.3.

*Example 9*

Dibenzyl·tin·diethoxide

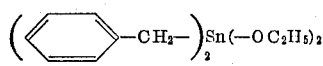

was mixed in an amount of 0.2% by weight with powdered polypropylene of which the intrinsic viscosity was 10.4 and the content of crystalline polymer was 97.0% by weight. The resulting mixture was extruded from the pelletizer without replacing with nitrogen gas. The extruding conditions were fixed as follows. The time of the polymer in the pelletizer was about 6 minutes. The temperature of the cylinder top was 270° C. The intrinsic viscosity of the polymer pellet was 1.6. The same polymer was subjected to pelletizing treatment in the same conditions as in above example, except that dibutyl·tin·diethoxide was not added thereinto. The intrinsic viscosity of the polymer pellet was 5.8.

*Example 10*

As shown in the following table, various kinds of organo-tin-compound were added with various kinds of polypropylene. The resulting mixture was subjected to a pelletizing treatment under various kinds of pelletizing conditions with or without nitrogen gas replacement to obtain polymer pellets, the intrinsic viscosities which are given in the following table. The low intrinsic viscosities obtained reflect the improvement according to the present invention.

What we claim is:

1. A process for improving the processability of crystalline high molecular weight polypropylene which comprises adding an orango-tin-compound in an amount of 0.005 to 2% by weight to raw material polyproylene based on the weight of said raw material polypropylene said raw material polypropylene containing crystalline polymer in a major portion and having an intrinsic viscosity of more than 2 as measured in tetraline solution at 135° C., and subjecting said resulting mixture to heat-treatment until said polypropylene is converted to polypropylene having a value of intrinsic viscosity between 0.5 and 3.0, said value being lower than the viscosity of the above-said raw material polypropylene, said organo-tin compound being selected from the group consisting of the compounds represented by the following general formulas, and in which in all of said formulas R is selected from the group consisting of an alkyl group having 1 to 18 carbon atoms, a benzyl group and a phenol group, (1) General formula $$[R]_2Sn[OOCR']_2$$

wherein R'COO is selected from the group consisting of a saturated monobasic fatty acid radical in which R' is an alkyl group having 1 to 17 carbon atoms and a monobasic phenolic acid radical in which R' is a phenol group, (2) General formula

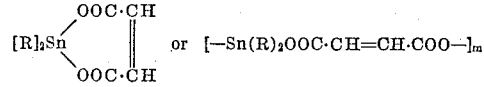

wherein $m$ is an integer, and $m \geq 1$, (3) General formula $$[R]_2Sn[OOC \cdot CH = CH \cdot COOR']_2$$

wherein R' is selected from the group consisting of an alkyl group having 1 to 18 carbon atoms and a hydroxyalkyl group having 2 to 4 carbon atoms,

| Addition agent | Treating conditions | | | | Raw-material polymer | | Product polymer |
|---|---|---|---|---|---|---|---|
| | Nitrogen replacement | Addition amount (percent) | Temp. (° C.) | Time (min.) | Intrinsic viscosity | Content of crystalline polymer (percent) | Intrinsic viscosity |
| $(C_4H_9)_2Sn(OOCC_{17}H_{35})_2$ | Without | 0.2 | 270 | 5 | 10.4 | 97.0 | 1.7 |
| $(C_4H_9)_2Sn(OOC \cdot CH=CHCOOCH_2CH_2OH)_2$ | With | 0.15 | 250 | 5 | 7.3 | 94.8 | 2.4 |
| $(C_4H_9)_2Sn\left(-O-\bigcirc\right)_2$ | do | 0.15 | 300 | 4 | 8.2 | 96.3 | 1.5 |
| $(C_4H_9)_2Sn \begin{smallmatrix} OC_2H_5 \\ OOC \cdot C_7H_{15} \end{smallmatrix}$ | do | 0.15 | 270 | 5 | 8.2 | 96.3 | 1.6 |
| $\left(\bigcirc CH_2-\right)_2 Sn \begin{smallmatrix} OOC \cdot CH \\ \| \\ OOC \cdot CH \end{smallmatrix}$ | do | 0.10 | 270 | 5 | 8.2 | 96.3 | 2.2 |
| $(C_4H_9)_2Sn \begin{smallmatrix} OCH_3 \\ OOC \cdot CH=CH \cdot COOCH_3 \end{smallmatrix}$ | do | 0.50 | 250 | 4 | 8.2 | 96.3 | 1.6 |
| $(C_4H_9)_2Sn[-OOC-\bigcirc-COOCH_2CH_2OCH_3]_2$ | do | 0.15 | 270 | 5 | 8.2 | 96.3 | 2.0 |
| $(C_4H_9)_2Sn=S$ | do | 0.10 | 250 | 5 | 8.2 | 96.3 | 1.9 |
| $(C_6H_{13})_2Sn=S$ | do | 0.20 | 260 | 4 | 7.3 | 94.8 | 1.6 |
| $(C_4H_9)_2Sn(SC_4H_9)_2$ | do | 2.0 | 250 | 5 | 15.5 | 97.0 | 1.8 |

(4) General formula $$[R]_2Sn[OR']_2 \text{ and } R'O-[Sn(R)_2O-]_sR'$$

wherein R' is selected from the group consisting of an alkyl group having carbon atoms and a phenyl group, and s is an integer, 1 to 18 and $s \geq 2$, (5) General formula $$R'O[-Sn(R)_2O-]_mOCR''$$

wherein R' is an alkyl group having 1 to 18 carbon atoms and R'' is an alkyl group having 1 to 17 carbon atoms, and m is an integer, and $m \geq 1$, (6) General formula $$R'O[-Sn(R)_2O-]_mOC \cdot CH = CH \cdot COOR''$$

wherein R' and R'' are alkyl groups having 1 to 18 carbon atoms respectively, and m is an integer, and $m \geq 1$, (7) General formula

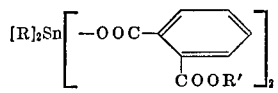

wherein R' is selected from the group consisting of an alkyl group having 1 to 18 carbon atoms, a hydroxyalkyl group having 2 to 4 carbon atoms, and an alkoxy-alkyl group represented by —R''OR' in which R'' is an alkyl group having 2 to 4 carbon atoms, (8) General formula $$[R]_2Sn=S \text{ and } [-Sn(R)_2S-]_m$$

wherein m is an integer, and $m \geq 1$, and (9) General formula $$[R]_2Sn[SR']_2$$

wherein R' is an alkyl group having 1 to 18 carbon atoms.

2. A process according to claim 1, wherein said heat treatment is carried out in a screw extruder.

3. A process according to claim 1, wherein said organo-tin-compound is dibutyl·tin·diacetate having the formula $(C_4H_9)_2Sn(OOC \cdot CH_3)_2$.

4. A process according to claim 1, wherein said organo-tin-compound is dibutyl·tin·dilaurate having the formula $(C_4H_9)_2Sn(OOC \cdot C_{11}H_{23})_2$.

5. A process according to claim 1, wherein said organo-tin-compound is dibutyl·tin·distearate having the formula $(C_4H_9)_2Sn(OOC \cdot C_{17}H_{35})_2$.

6. A process according to claim 1, wherein said organo-tin-compound is selected from the group consisting of

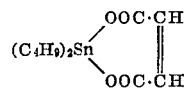

and polymers thereof.

7. A process according to claim 1, wherein said organo-tin-compound is $(C_4H_9)_2Sn(OCH_3)_2$.

8. A process according to claim 1, wherein said organo-tin-compound is $CH_3O[Sn(C_4H_9)_2O]_mOC \cdot CH_3$.

9. A process according to claim 1, wherein said organo-tin-compound is $C_2H_5O]Sn(C_4H_9)_2O]_mOC_7H_{15}$.

10. A process according to claim 1, wherein said organo-tin-compound is $$CH_3O[Sn(C_4H_9)_2O]_mOC \cdot CH = CHCOOCH_3$$

11. A process according to claim 1, wherein said organo-tin-compound is $(C_4H_9)_2Sn(SC_{12}H_{25})_2$.

No references cited.

JOSEPH L. SCHOFER, *Primary Examiner.*